United States Patent [19]

Kearns

[11] 3,728,603
[45] Apr. 17, 1973

[54] WINDSHIELD WIPER CONTROL
[76] Inventor: Robert W. Kearns, 20524 Rutherford Avenue, Detroit, Mich. 48235
[22] Filed: Oct. 27, 1970
[21] Appl. No.: 84,451

Related U.S. Application Data

[62] Division of Ser. No. 815,060, April 10, 1969, Pat. No. 3,581,178.

[52] U.S. Cl............318/443, 318/DIG. 2, 15/250.12
[51] Int. Cl....................................................B60s 1/08
[58] Field of Search....................318/443; 15/250.12

[56] References Cited

UNITED STATES PATENTS 2,659,840  11/1953  Yonkers, Jr.....................317/113 X
3,333,174  7/1967  Moller et al..........................318/443
3,339,123  8/1967  Riester.................................318/443

Primary Examiner—J. D. Miller
Assistant Examiner—Robert J. Hickey
Attorney—Lane, Aitken, Dunner & Ziems

[57] ABSTRACT

An electric control device controlling a wiper motor to operate windshield wiper blades intermittently with a dwell period between successive wiping cycles. The wiper motor current is carried by relay contacts and a solid state timing circuit controls the energization of the relay coil.

1 Claim, 4 Drawing Figures

INVENTOR
ROBERT W. KEARNS

INVENTOR
ROBERT W. KEARNS

WINDSHIELD WIPER CONTROL

CROSS-REFERENCE TO RELATED APPLICATION

This is a divisional application based on applicant's copending application Ser. No. 815,060 filed Apr. 10, 1969, issued May 25, 1971, as U.S. Pat. No. 3,581,178.

BACKGROUND OF THE INVENTION

In my U.S. Pat. No. 3,351,836 issued on Nov. 7, 1967, a transistorized control device is disclosed for controlling the electric motor of an automotive windshield wiper motor unit. The control device can be actuated by the driver to off, continuous and intermittent positions. In the continuous position the wiper blades operate continuously through repeating wiping cycles. In the off position they complete the wiping cycle in progress and stop at the park position. In the intermittent position the wiper blades operate for a complete wiping cycle and stop at the end of each wiping cycle for a dwell period.

In the control device of my patent the emitter-collector of a transistor is connected in series with the electric motor to control the energization and deenergization of the motor. A capacitive timing circuit cooperates with the base circuit of the transistor to bias it off for the dwell periods at the end of each wiping cycle in the intermittent mode of operation. An electrodynamic brake resistor is connected across the motor to electrodynamically brake the motor at the beginning of each dwell period. At the end of each dwell period, the brake resistor remains connected across the motor until the motor rotates through a small angle to activate a motor responsive switch to disconnect the brake resistor. This reduces the starting torque when the motor is energized by the transistor to begin the next wiping cycle.

SUMMARY OF THE INVENTION

The present invention provides a wiper control device having a relay in place of the aforementioned transistor for controlling the energization of the wiper motor. The relay contacts also connect an electrodynamic brake across the motor when the motor is deactivated. The transistor and capacitive timing means of my patent are employed in the intermittent mode for controlling the energization and deenergization of the relay coil so that the transistor carries the much lower current of the relay coil. When the relay coil is energized to start the next wiping cycle, the relay contacts disconnect the electrodynamic brake and connect the motor to the battery to produce full power at the very beginning of each wiping cycle.

The preferred embodiment employs a three-brush, permanent magnet motor having high and low speed brushes. When the low speed brush is used, the control device operates the motor in the intermittent mode of operation with electrodynamic braking when the motor is deenergized. When the high speed brush is used, the wiper blades cycle continuously at high speed, and the relay contacts are maintained in a position such that the electrodynamic brake is disengaged and does not interfere with the high speed continuous operation.

The preferred embodiment is particularly well suited for the after market, rather than the OEM market, that is, for installation on cars after delivery from the factory, rather than for installation by the manufacturer on the production line. All of the electrical components of the control device are contained in a small housing or cover mounted on the bottom of the relay can to provide a simple, economic package that can be mounted on the dashboard and spliced into the wires connecting the existing wiper control switch to the wiper motor without making any changes in the control switch and motor.

The objects and features of novelty of the present invention will be pointed out specifically or will otherwise become apparent when referring, for a better understanding of the invention, to the following description taken in conjunction with the accompanying drawings.

DESCRIPTION OF THE PREFERRED EMBODIMENTS

Figure 1:
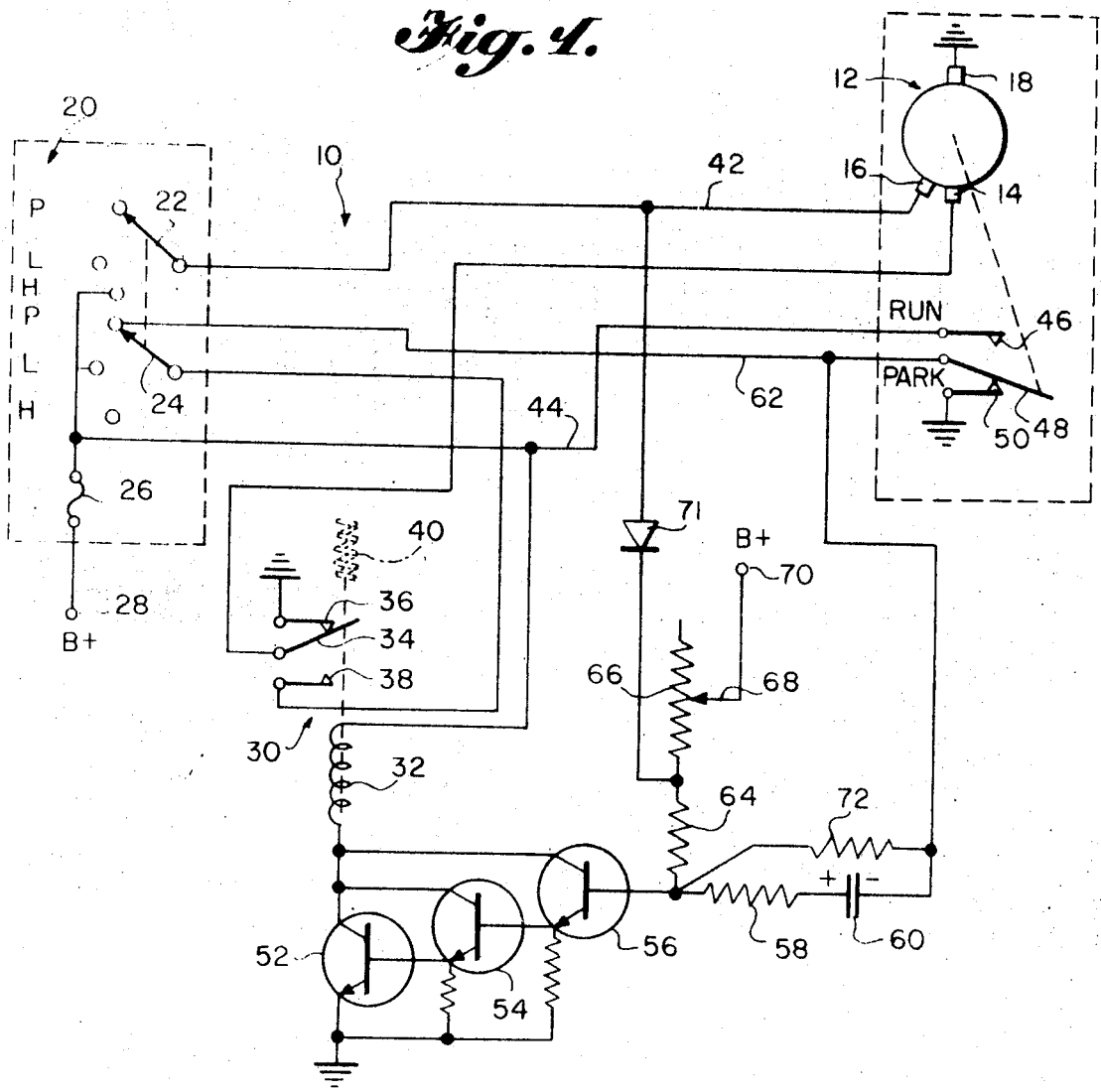
FIG. 1 is a schematic diagram of a control device embodying features of the invention.

Referring to FIG. 1, a control device 10 is illustrated which embodies features of the invention. It controls the operation of a conventional three-brush permanent magnet motor 12 having a low speed brush 14, a high speed brush 16 and a third brush 18 connected directly to ground. As is well known, when the battery potential B+ is applied to the high speed brush 16, fewer of the armature windings are energized between the high speed brush and the third brush 18 as compared to the windings energized when the potential B+ is applied between the low speed brush 14 and the brush 18. Therefore, in the high speed position the motor operates at a higher speed and lower torque than in the low speed position.

A conventional control switch 20 is provided which can be mounted on the dashboard of the automotive vehicle in position to be operated by the driver. The control switch has moveable contacts 22 and 24 mechanically coupled together for actuation by a single knob (not shown). In the position illustrated, the moveable contacts 22 and 24 engage their respective park terminals P and are moveable into engagement with low speed terminals L and high speed terminals H. The high speed terminal H associated with the moveable contact 22 is connected through a circuit breaker 26 to a terminal 28 which is connected to the positive terminal of the vehicle battery to apply a potential B+ to the terminal 28. The low speed terminal L associated with the moveable contact 24 also is connected to the terminal 28.

A relay 30 is provided with a relay coil 32 for actuating a moveable contact 34 between a fixed contact 36 connected to ground and a fixed contact 38 connected to the moveable contact 24 of the control switch. The moveable contact 34 is normally biased into engagement with the fixed contact 36 by a spring 40 when the relay coil 32 is deenergized as shown in FIG. 1.

One end of the relay coil 32 is connected to a wire 44 having one end thereof connected to B+ through the terminal 28. The other end of the wire 44 is connected to a fixed contact 46 associated with a moveable contact 48 of a motor responsive switch having another fixed contact 50 connected to ground. The other end of the relay coil 32 is connected to ground through the emitter-collector circuits of three transistors 52, 54 and 56.

One end of a resistor 58 is connected to the base of the transistor 56 and the other end is connected to the negative side of a capacitor 60. The positive side of the capacitor is connected to a wire 62 having one end connected to the moveable contact 48 and the other end connected to the park terminal P associated with the moveable contact 24 of the control switch 20. One end of a resistor 64 is connected to the juncture between the resistor 58 and the transistor 56, and the other end is connected to a resistor 66 of a potentiometer having a wiper arm 68 connected to a terminal 70 which is connected to the potential B+. A diode 71 is connected between a wire 42 and the juncture between the resistor 64 and the potentiometer resistor 66. The wire 42 connects the high speed brush 16 to the moveable contact 22. A resistor 72 is connected in parallel with the resistor 58 and the capacitor 60.

By way of example, the resistors may have the following values: 2.7K for the resistor 58, 1.5K for the resistor 64, 1 megohm for the potentiometer resistor 66 and 390K for the resistor 72. The capacitor may have a value of 10mfd at 15 WVDC.

The moveable contact 48 of the motor responsive switch is actuated by the motor 12 so that is cycles once each wiping cycle of the wiper blades. The moveable contact 48 engages the fixed contact 46 (hereinafter referred to as the "run" contact) during a wiping cycle and engages the fixed contact 50 (hereinafter referred to as the "park" contact) while the wiper blades move through a small angle near the end of each wiping cycle.

When the operator turns the control switch 20 to the low speed position the moveable contact 24 engages the low speed terminal L and is connected to B+ through the terminal 28. The wiper arm 68 is then moved from a position out of engagement with the upper end of the potentiometer resistor 66 into engagement with the upper end so as to apply B+ to the potentiometer resistor through the terminal 70. This makes the base of the transistor 56 positive and turns the transistors on to energize the relay coil 32 and move the moveable contact 34 into engagement with the fixed contact 38. Since the fixed contact 38 is connected to B+ through the moveable contact 24 of the control switch 20, and since the moveable contact 34 is connected directly to the low speed brush 14 of the motor, the motor is energized at low speed and the wiper blades begin a wiping cycle.

After a few degrees of movement the moveable contact 48 automatically moves into engagement with the run contact 46 of the motor responsive switch, and remains in this position until the wiper blades complete a wiping cycle. Thus, during a wiping cycle while the moveable contact 48 engages the run contact 46, the right side of the capacitor 60 is connected to B+ through the terminal 28 and the capacitor 60 charges as described in my aforementioned patent. At the end of the wiping cycle, the moveable contact 48 is moved into engagement with the park contact 50 to connect the right side of the capacitor to ground. Since the charge across the capacitor cannot change instantaneously, this drops the potential on the negative side of the capacitor by the amount of the charge on the capacitor. This applies a negative potential to the base of the transistor 56 to bias the transistors off, deenergize the relay coil 32 and shift the moveable relay contact 34 into engagement with the fixed contact 36 to connect the low speed brush 14 to ground. Since the third brush 18 also is connected to ground, the motor is electrodynamically braked to a stop.

The transistors remain off for a time interval determined by the time it takes for the capacitor 60 to discharge through the RC timing circuit including the resistors 58 and 64, and the potentiometer 60. Since the potentiometer resistor 66 is large in comparison to the other two resistors, it in effect controls the discharge time of the capacitor. When the capacitor discharges sufficiently so that the base of the transistor 56 again becomes slightly positive, the transistors are biased on to begin the next wiping cycle. Specifically, the relay 32 is energized by the transistor, the moveable contact 34 is moved into engagement with the fixed contact 38 to connect the low speed brush 14 to B+, and the motor 12 is energized to start the next wiping cycle. It is important to note, however, that before the motor is energized to start the wiping cycle, the ground connection at the fixed relay contact 36 is broken to disconnect the electrodynamic brake across the motor 12 so that the motor starts the wiping cycle with the full torque at low speed.

The length of time of the swell period can be varied by changing the position of the wiper arm 68 to vary the portion of the potentiometer resistor 66 through which the capacitor 60 discharges. As the wiper arm 68 moves from the open end of the resistor toward the end thereof connected to the resistor 64, the resistance decreases and the dwell period decreases. During this movement a point will be reached near the lower end of the potentiometer resistor 66 where a positive potential is applied continuously to the base of the transistor 56 through the terminal 70 regardless of the charging and discharging of the capacitor 60. Therefor, at this point, the relay coil 32 will remain energized continuously and the wiper blades will operate continuously at low speed without dwell periods and without electrodynamic braking.

When the control switch is moved to the high speed position, the moveable contact 22 engages the high speed terminal H and is connected to B+ through the terminal 28. This applies B+ directly to the high speed brush 16 through the wire 42 and operates the motor 12 at high speeds. At the same time the juncture between the resistor 64 and the potentiometer resistor 66 is connected to B+ through the diode 70 so that the transistors remain biased on continuously during high speed operation. This maintains the relay coil 32 energized continuously which, in turn, maintains the moveable contact 34 in engagement with the fixed contact 38 which is not connected to any potential. Maintaining the moveable relay contact 34 in this position prevents the electrodynamic brake being applied to the motor while it is in high speed operation.

When the control switch 20 is moved to the park position as illustrated, the moveable contact 24 is connected to the moveable contact 48 of the motor responsive switch through the wire 62. At the same time, the wiper arm 68 is disconnected from the upper end of the potentiometer resistor 66 to remove the B+ potential applied through the terminal 70. If the moveable contact 48 of the motor responsive switch is in the position illustrated wherein it engages the park contact 50, the transistors will be biased off and the relay coil 32 will be deenergized to terminate the wiping operation with the wiper blades in the park position. If the moveable contact 48 is engaging the run contact 46, the wiping cycle in progress will continue until the end of the cycle at which point the moveable contact moves into engagement with the park contact 50 to apply the electrodynamic brake and terminate further wiping operations.

Figure 2:
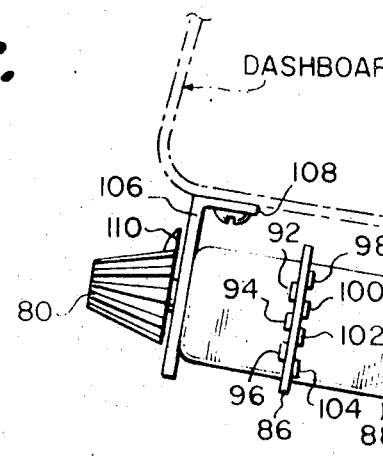
FIG. 2 is a side view of the package for the electronic components of the control device.

In the preferred embodiment just described, the wiper arm 68 is operated by a separate control knob 80 mounted on a package 82, as illustrated in FIG. 2. The package 82 comprises a conventional relay 84 having an insulated base 86 and a housing 88 mounted on the base to enclose the relay components. The latter includes the relay coil 32 and contacts 34-38. The remaining electronic components of the control device contained in a housing 90 mounted on the underside of the insulated base 86. These include the transistors 52-56, the diode 71, the capacitor 60, and all of the resistors illustrated in FIG. 1.

Three terminals 92-96 are mounted on and project from the underside of the base 86 for making the external connections to the components within the cover 90. Specifically, the terminal 92 is used to make the ground connection for the emitters of the transistors, the terminal 94 is used to connect the diode 71 to the wire 42 and the terminal 96 is used to connect the positive side of the capacitor to the wire 62 of FIG. 1. Four terminals 98-104 are mounted on and project from the upper side of the insulated base 86 for making the next connections to the relay coil and contacts. Specifically, the terminal 98 is used to connect the stationary contact 36 to ground, the terminal 100 is used to connect the stationary contact 38 to the moveable contact 24, the terminal 102 is used to connect the moveable contact 84 to the low speed brush 14 and the terminal 104 is used to connect the relay coil to the wire 44. The connection between the relay coil 32 and the transistors 52-56 is made internally and, therefore, not shown in FIG. 2.

A mounting or face plate 106 is secured to the cover 90. It has a flange 108 on one edge thereof for mounting the package 82 on the underside of the dashboard of an automotive vehicle, preferably immediately below the windshield wiper control switch 20 so that the control knob 80 is in a convenient position to be adjusted by the driver to control the position of the wiper arm 68.

The knob 80 is provided with a pointer 110 which cooperates with suitable indicia on the exposed face of the plate 106 to indicate the position of the wiper arm 68. For example, the indicia could indicate the following positions of the knob 80; OFF, MAXIMUM DWELL, MINIMUM DWELL and LOW SPEED. In its extreme counterclockwise position the pointer 110 would point to OFF and, in this position, the wiper arm 68 would be disconnected from the open end of the potentiometer resistor 66. When the knob 80 is moved in a clockwise direction to the MAXIMUM DWELL position, the wiper arm 68 would be connected to the end of the potentiometer resistor 66. As the knob is moved from this position to the MINIMUM DWELL position, the wiper arm 68 decreases the portion of the potentiometer resistance 66 through which the capacitor 60 discharges. When the knob 80 is rotated to its extreme clockwise position with the pointer 110 pointing to the LOW SPEED position, the wiper arm 68 would be at its lowermost position and remove all of the potentiometer resistor 66 from the discharge path of the capacitor 60.

It is apparent that the control device of FIGS. 1 and 2 readily lends itself to sale in the aftermarket. The control device would be marketed in the form of the package 82, and would have suitable wires connected to the terminals 92-104 for making the necessary connections to the existing wiper control switch and motor of the particular car for which the control device is designed. As mentioned previously, the control switch 20, the motor 12 (and the motor responsive switch actuated thereby) and the connecting wires 42, 44 and 62 are those now being used by one of the leading car manufacturers on some of its cars. Therefore, for these cars, the package 82 need only be mounted beneath the dashboard and the wires on the terminals 92-104 connected as shown in FIG. 1.

Figure 3:
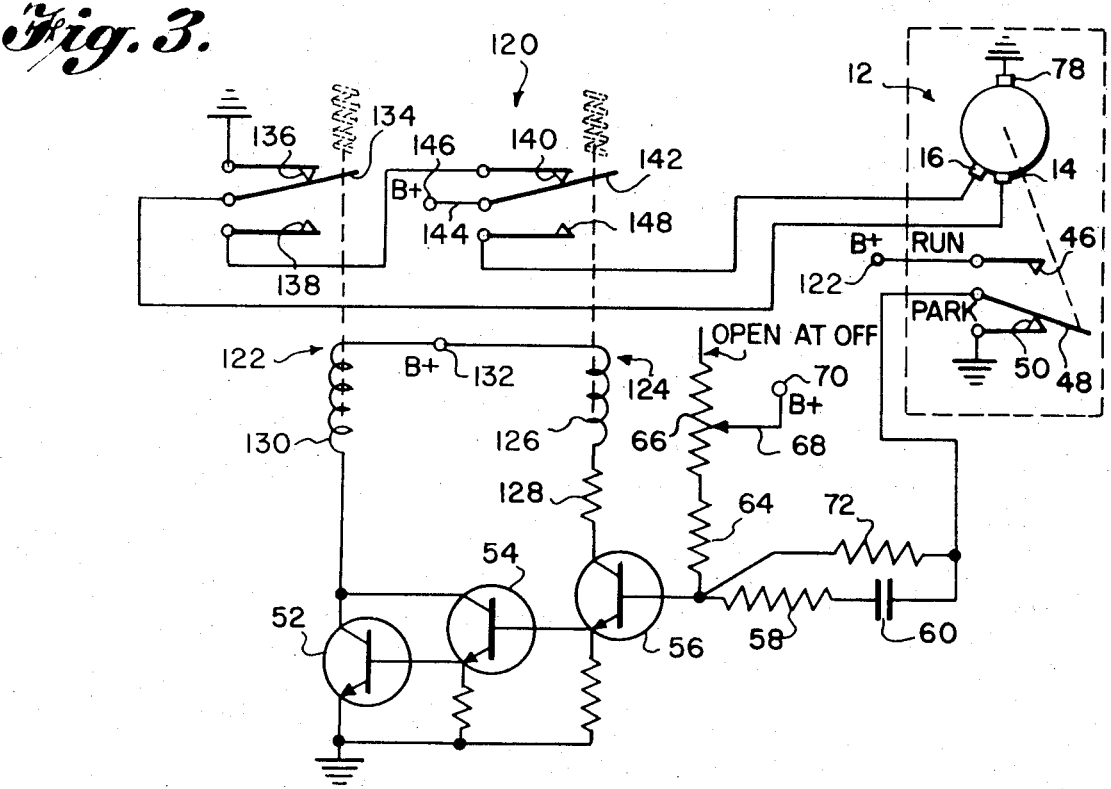
FIG. 3 is a schematic circuit diagram of a control device illustrating another embodiment of the invention.

Referring to FIG. 3 a control device 120 is shown which illustrates another embodiment of the invention for controlling the motor 12. As in the embodiment of FIG. 1 the motor 12 actuates the motor responsive switch having the moveable contact 48 and the run and park contacts 46 and 50. The park contact 50 is connected directly to ground and the run contact 46 is connected to a terminal 122 which is connected to the positive terminal of the battery.

The main difference between the control device 120 and the control device of FIG. 1 is that it employs two relays 122, and 124, and that it does not employ a control switch 20. Its entire operation is controlled by the position of the wiper arm 68. The transistors, resistors and capacitor are the same as those of FIG. 1. However, the collector of transistor 56 is connected to coil 126 of relay 124 through a resistor 128. The other ends of each of the relay coils are connected to B+ through a terminal 132. The moveable contact 134 of the relay 122 is connected to the low speed brush 14, the fixed contact 136 is connected to ground and the fixed contact 138 is connected to a fixed contact 140 of the relay 124. A moveable contact 142 is connected to B+ through a circuit breaker 144 and a terminal 146. A fixed contact 148 of the relay 124 is connected to the high speed brush 16 of the motor.

When the knob which controls the wiper arm 68 is in its OFF position, the motor 12 is deenergized, the wiper blades are in the park position and the wiper arm 68 is disconnected from the open end of the potentiometer resistor 66. When the knob is rotated to engage the wiper arm with the open end of the potentiometer resistor 66, the wiper blades operate in the intermittent mode of operation as previously described with a dwell period between successive wiping cycles. As before the length of time of the dwell periods is determined by the rate at which the capacitor 60 discharges through the potentiometer resistor 66. When the capacitor discharges sufficiently to bias the base of the transistor 56 positive, all three transistors turn on to energize the relay coil 130 to start the next wiping cycle. The relay coil 126 is not energized, despite the fact that the transistor 56 is biased on, because of the resistor 128 which controls the switching point and hysterisis of the relay 124. The value of the resistance 128 is about 22 ohms, and all of the other resistors have the same resistance values, the same as in the embodiment of FIG. 1.

When the relay coil 130 is energized, as just described, the moveable contact 134 engages the fixed contact 138 to connect the low speed brush 14 to B+ through the contacts 140 and 142 of the relay 124. During the wiping cycle, the moveable contact 48 of the motor responsive switch engages the run contact 46 to charge the capacitor 60 as before. At the end of the wiping cycle, the moveable contact 48 engages the park contact 50 to stop the wiper blades for a dwell period by jumping the charge on one side of the capacitor 60 to bias the transistors off as previously described.

When the wiper arm 68 is moved to decrease the potentiometer resistor 66 in circuit with the capacitor 60, the length of the dwell periods decreases. As the potentiometer resistance is decreased, a first point is reached where relay coil 130 remains energized continuously (with relay coil 126 still deenergized) so that the wiper blades operate continuously at low speeds without dwell periods despite the charging and discharging of the capacitor 60 during each wiping cycle.

When the potentiometer resistance 66 is decreased still further, a second point is reached where the current passing through the relay coil 126 is sufficient to energize the relay coil and move the moveable contact 142 into engagement with the fixed contact 148. This connects the high speed brush 60 directly to B+ through the terminal 146 and breaks the circuit to the low speed brush 14 so that the wiper blades operate continuously at high speed. Therefore, the first and second points on the potentiometer resistor 66 as just described correspond to the low and high speed positions, respectively.

The wiper arm 68 can be controlled by a single control knob similar to the control knob 80 of FIG. 2, and the pointer of the control knob can cooperate with suitable indicia to indicate four different positions, OFF, MAXIMUM INTERMITTENT, LOW SPEED and HIGH SPEED continuous positions. As in the case of FIG. 2 the relays and all the electronic components can be contained in a single package suitable for the after market. However, in this case, the wiper motor switch already on the car would not be used, and the wiper blades would be controlled solely by the knob which controls the position of the wiper arm 68.

When the wiper arm 68 is moved to the OFF position out of engagement with the potentiometer resistor 66, the wiper blades complete the cycle in progress because B+ is connected to the positive side of the capacitor 60 through the run contact 46 and the moveable contact 48. When the wiper blades reach the park position the moveable contact 48 engages the park contact 50 to bias the transistors off and terminate further wiping operations. As in the control device of FIG. 1, the parking operation is accomplished through the low speed brush 14.

If desired, the fixed contact 136 can be connected to ground through a predetermined brake resistance which is connected across the motor when the motor is deenergized. This electrodynamically brakes the motor with a braking force less than that when the brushes 14 and 18 are connected to ground. This same resistance could be added to the control device 10 of FIG. 1. By providing such a braking resistor, the safety skip feature of my aforementioned patent is introduced in the intermittent mode of operation so that when the moisture on the windshield changes, the dwell periods are skipped automatically to provide continuous operation until the moisture decreases sufficiently to enable the dwell periods to commence again automatically. The safety skip feature can be added to the control device 10 of FIG. 1 by connecting the fixed contact 36 to ground through the same type of brake resistance.

Figure 4:
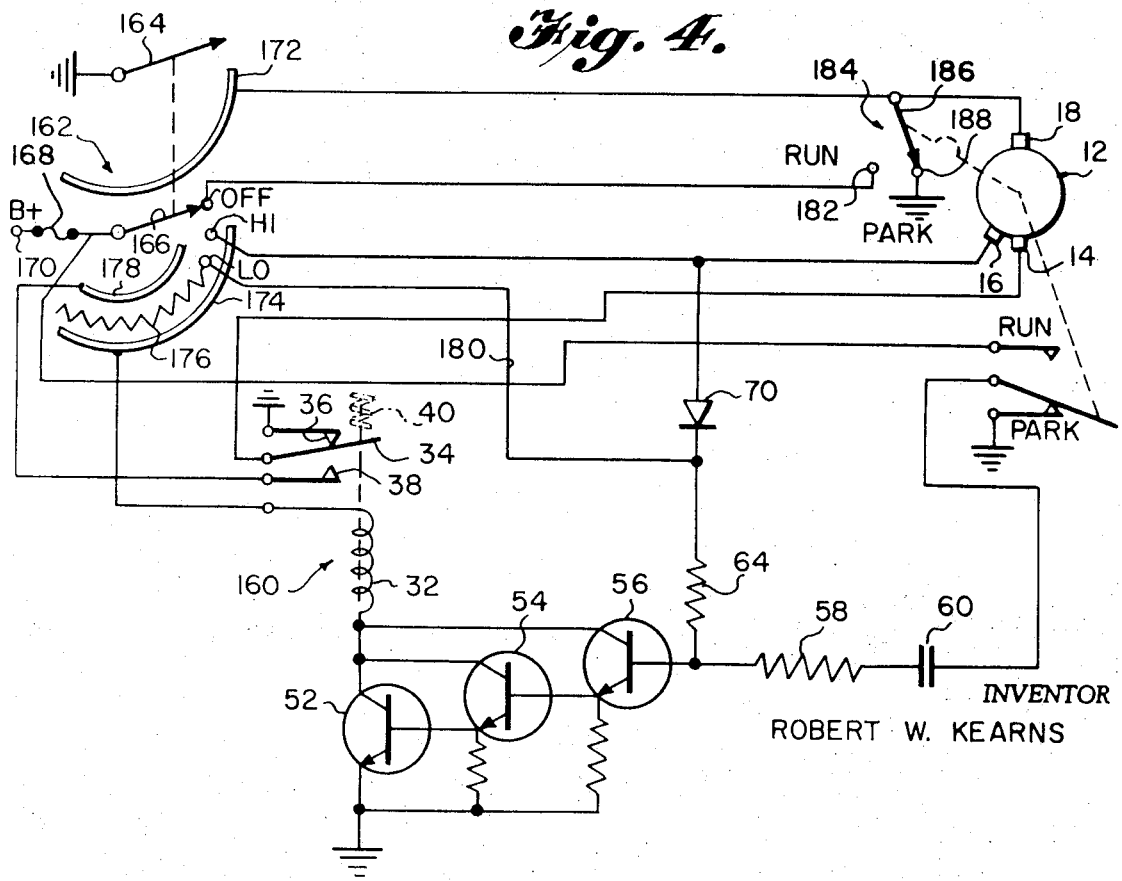
FIG. 4 is a schematic circuit diagram of a control device illustrating a further embodiment of the invention.

Referring to FIG. 4, a control device 160 is illustrated which is more suited for the OEM market because it employs a special wiper control switch 162 which can best be installed in the car by the car manufacturer. The control switch 162 has a pair of moveable contacts 164 and 166 connected together for actuation by a single control knob or lever (not shown). The moveable contact 164 is connected to ground and the moveable contact 166 is connected to B+ potential through a circuit breaker 168 and a terminal 170. An arcuate contact 172 is associated with the moveable contact 164 and connected directly to the brush 18 of the motor 12. An identical arcuate contact 174 is associated with the moveable contact 166 and connected directly to the upper end of the relay coil 32. A potentiometer resistor 176 is positioned within the arcuate contact 164 with one end thereof connected to a low speed terminal LO which, in turn, is connected to the juncture between the diode 70 and the resistor 64. A high speed terminal HI is located between the low speed terminal and an OFF terminal which is engaged by the moveable contact 166 in the OFF position, as illustrated in FIG. 4. A shorter arcuate contact 178 is positioned within the potentiometer resistor 176 and connected directly to the fixed relay contact 38. As before, the fixed relay contact 36 is connected directly to ground.

To start the wiper blades the control switch 162 is moved by the driver to the high speed position wherein the moveable contact 164 engages the arcuate contact 172 and the moveable contact 166 engages the HI terminal. This connects the brush 18 to ground through the moveable contact 164 and the high speed brush 16 to B+ through the moveable contact 166 and the terminal 170 so that the wiper motor is energized continuously at high speed. As in the embodiment of FIG. 1, the transistors are biased on because of the positive potential applied to the base of the transistor 56 through the diode 70, an therefore, the relay 32 remains energized to maintain the moveable contact 34 in engagement with the fixed contact 38 to prevent the electrodynamic break from being applied during high speed operation.

When the control switch 162 is moved by the driver to the low speed position, the moveable contact 166 engages the arcuate contact 178 and the LO terminal. This breaks the circuit to the high speed brush 16 and connects the resistor 64 to B+ through the wire 180, the moveable contact 166 and the terminal 170. Therefore, the transistors are biased on continuously to maintain the relay coil 32 energized continuously, and the moveable contact 34 engages the fixed contact 38 to connect the low speed brush 16 to B+ through the arcuate contact 178, the moveable contact 166 and the terminal 170. Consequently, the wiper blades operate continuously at low speed.

As the moveable contact 166 is rotated in a clockwise direction from the LO terminal, the portion of the potentiometer resistor 176 in series with the resistor 64 increases until a point is reached at which the transistors are biased off for dwell periods at the end of each wiping cycle with the length of the dwell periods determined by the time it takes for the capacitor 60 to discharge through the portion of the potentiometer resistor 176 connected in the circuit. When the entire potentiometer resistor 176 is connected in the circuit, the dwell periods are at their maximum, as in the case of the control device of FIG. 1.

When the control switch 162 is moved to the off position as illustrated in FIG. 4, the moveable contact 164 is disconnected from the arcuate contact 172 to break the ground connection to the brush 18. The moveable contact 166 engages the OFF terminal to connect a run contact 182 of a reverse park switch 184 to B+ through the terminal 170. Assuming a wiping cycle is in progress, when the control switch 162 is turned to OFF, the moveable contact 186 of the reverse park switch is in engagement with the run contact 182 to connect the brush 18 to B+. The low speed brush 14 is connected to ground through the moveable relay contact 34 and fixed relay contact 36, the relay coil 32 being deenergized as soon as the moveable contact 166 is disconnected from the arcuate contact 174 to remove B+ from the upper end of the relay coil 32.

With the brush 18 at B+ and the low speed brush 14 at ground, the motor 12 operates in reverse until the wiper blades reach the park position. At this point the moveable contact 186 of the reverse park switch moves to its park contact 188 to ground the brush 18. This electrodynamically brakes the motor 12 to a stop at the park position and terminates further wiping cycles.

The reverse park switch 184 is a well known type of switch employed by car manufacturers to provide a depressed park position, and therefore, will not be described in detail. It is sufficient to state that it is actuated by the motor 12 only when the motor 12 is operating in the reverse direction, as just described. The reverse park switch includes a camming mechanism for mechanically extending the linkages of the wiper system during reverse operation to move the wiper blades to the depressed park position before terminating the wiper operation.

The control device 162 provides an advantageous wiper control which can be controlled by the driver by actuating a single knob or lever of the control switch 162. By moving the control knob or lever in one direction from its off position the wiper blades will successively pass through a high speed continuous position, a low speed continuous position and then into intermittent operation with increasing dwell periods as the knob or lever is moved further.

The control device also brings the reverse park switch 184 into play in a simple manner when the control switch 162 is returned to its off position. As in the other embodiments, the wiper motor 12 is run at low speed during the parking operation to develop maximum torque. This is important, particularly when the wiper blades are moved off of the glass into a slot along the bottom of the windshield in order to reach the depressed park position as they are in many to today's cars. Moving the wiper blades off the glass into such a slot requires significantly greater torque as compared to parking them on the glass.

I claim:

1. A control device for activating windshield wiper drive means for driving wiper blades through repeating wiping cycles comprising relay means having first, second and third conditions, and control means for activating said drive means when said relay means is in said first condition and deactivating said drive means when said relay means is in said second condition, said control means including a variable resistance having a movable wiper arm, said control means cycling said relay means through said first and second conditions in a manner to drive said wiper blades through repeating wiping cycles with dwell periods between successive wiping cycles, the length of time of said dwell periods being determined by the value of said resistance, said control means operating said wiper blades continuously at a first speed without dwell periods between wiping cycles with said relay means maintained in said first condition when said resistance reaches a first predetermined value and continuously at a second speed with said relay means maintained in said third condition when the value of said resistance reaches a second predetermined value, said control means parking said wiper blades and terminating further wiping cycles when said wiper arm is disconnected from said variable resistance.

* * * * *